United States Patent
Lai et al.

(10) Patent No.: US 11,272,398 B2
(45) Date of Patent: Mar. 8, 2022

(54) DECENTRALIZED BASE STATION LOAD BALANCING AND POWER

(71) Applicant: Telefonaktiebolaget LM Ericsson (publ), Stockholm (SE)

(72) Inventors: Xiaoming Lai, Ottawa (CA); Xixian Chen, Ottawa (CA); Weigang Li, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 20 days.

(21) Appl. No.: 16/320,158

(22) PCT Filed: Jul. 25, 2016

(86) PCT No.: PCT/IB2016/054430
§ 371 (c)(1),
(2) Date: Jan. 24, 2019

(87) PCT Pub. No.: WO2018/020292
PCT Pub. Date: Feb. 1, 2018

(65) Prior Publication Data
US 2019/0274066 A1    Sep. 5, 2019

(51) Int. Cl.
*H04W 28/08* (2009.01)
*H04W 36/08* (2009.01)
(Continued)

(52) U.S. Cl.
CPC ........... *H04W 28/08* (2013.01); *H04W 36/08* (2013.01); *H04W 36/165* (2013.01);
(Continued)

(58) Field of Classification Search
None
See application file for complete search history.

(56) References Cited

U.S. PATENT DOCUMENTS

| 6,266,531 | B1 * | 7/2001 | Zadeh | H04W 16/06 455/436 |
| 6,584,330 | B1 * | 6/2003 | Ruuska | H04W 52/0206 455/574 |

(Continued)

OTHER PUBLICATIONS

Xiang Sheng et al., "Leveraging Load Migration and Basestation Consolidation for Green Communications in Virtualized Cognitive Radio Networks," pp. 1267-1275, Published in: IEEE 2013 Proceedings INFOCOM, Conference Location: Turin, Italy, ISSN: 0743-166X, DOI: 10.1109/INFCOM.2013.6566919, Print ISBN: 978-1-4673-5944-3, INSPEC Accession No. 13682105 Date of Conference: Apr. 14-19, 2013, consisting of 9-pages.
(Continued)

*Primary Examiner* — Hassan A Phillips
*Assistant Examiner* — Gautam Sharma
(74) *Attorney, Agent, or Firm* — Sage Patent Group

(57) ABSTRACT

A method and base station for distributing wireless device traffic load in a wireless communication system having a plurality of base stations are provided. A method includes determining a wireless device traffic load on a serving base station of the plurality of base stations. The method also includes determining a priority for each of a plurality of target base stations of the plurality of base stations, the priority being based at least in part on a number of wireless devices being served by the serving base station that receive a signal from a corresponding target base station that exceeds a threshold. The method further includes determining whether to change the load of the serving base station and sending a load change request to a target base station having a highest priority based on a comparison of the load on the serving base station to a load change threshold.

10 Claims, 10 Drawing Sheets

(51) Int. Cl.
*H04W 36/16* (2009.01)
*H04W 36/22* (2009.01)
*H04W 36/06* (2009.01)
*H04W 36/20* (2009.01)
*H04W 36/38* (2009.01)
*H04W 24/02* (2009.01)
*H04W 52/02* (2009.01)

(52) U.S. Cl.
CPC ............ *H04W 36/22* (2013.01); *H04W 24/02* (2013.01); *H04W 36/06* (2013.01); *H04W 36/20* (2013.01); *H04W 36/38* (2013.01); *H04W 52/02* (2013.01)

(56) References Cited

U.S. PATENT DOCUMENTS

| | | | |
|---|---|---|---|
| 7,353,030 B2 | 4/2008 | Singh | |
| 8,660,547 B2 | 2/2014 | Marin | |
| 8,886,262 B2* | 11/2014 | Samdanis | H04W 24/02 455/574 |
| 9,084,117 B2* | 7/2015 | Dimou | H04W 52/343 |
| 2005/0037727 A1* | 2/2005 | Kansal | H04W 52/0225 455/343.1 |
| 2005/0117530 A1* | 6/2005 | Abraham | H04W 52/0232 370/310 |
| 2006/0293060 A1 | 12/2006 | Yang et al. | |
| 2007/0115906 A1* | 5/2007 | Gao | G06F 30/33 370/338 |
| 2008/0163233 A1* | 7/2008 | Kobayashi | G06F 11/3433 718/104 |
| 2008/0214221 A1* | 9/2008 | Kiyomoto | H04W 88/085 455/517 |
| 2010/0151920 A1* | 6/2010 | Song | H04W 52/0206 455/574 |
| 2010/0267387 A1 | 10/2010 | Stephens | |
| 2011/0128862 A1 | 6/2011 | Kallin et al. | |
| 2011/0170466 A1* | 7/2011 | Kwun | H04W 52/0206 370/311 |
| 2011/0256833 A1* | 10/2011 | Racz | H04L 1/24 455/63.1 |
| 2012/0004009 A1* | 1/2012 | Lindoff | H04W 52/0206 455/522 |
| 2012/0009972 A1* | 1/2012 | Viering | H04W 36/0083 455/525 |
| 2012/0015682 A1* | 1/2012 | Scipione | H04W 52/325 455/522 |
| 2012/0028674 A1* | 2/2012 | Zhao | H04W 52/0235 455/522 |
| 2012/0040684 A1 | 2/2012 | Gao et al. | |
| 2012/0057503 A1* | 3/2012 | Ding | H04W 24/02 370/254 |
| 2012/0082028 A1* | 4/2012 | Kojima | H04W 36/22 370/230 |
| 2012/0106349 A1* | 5/2012 | Adjakple | H04W 52/0212 370/241 |
| 2012/0202503 A1 | 8/2012 | Kitaji | |
| 2013/0072259 A1* | 3/2013 | Kusano | H04W 36/16 455/561 |
| 2013/0130670 A1 | 5/2013 | Samdanis et al. | |
| 2014/0073311 A1* | 3/2014 | Xu | H04W 52/0206 455/418 |
| 2014/0219150 A1* | 8/2014 | Lee | H04W 52/0206 370/311 |
| 2014/0233387 A1* | 8/2014 | Zheng | H04W 12/06 370/235 |
| 2014/0328239 A1* | 11/2014 | Takiguchi | H04W 52/0216 370/311 |
| 2014/0349704 A1 | 11/2014 | Xiao et al. | |
| 2015/0189588 A1* | 7/2015 | Westberg | H04W 28/0221 370/311 |
| 2015/0245270 A1* | 8/2015 | Wu | H04W 36/22 370/331 |
| 2015/0257095 A1* | 9/2015 | Sun | H04W 52/0206 370/311 |
| 2015/0382290 A1* | 12/2015 | Yaacoub | H04W 24/02 370/311 |
| 2016/0057732 A1* | 2/2016 | Li | H04W 24/02 370/331 |
| 2017/0187628 A1* | 6/2017 | Chan | H04W 28/0252 |
| 2017/0318526 A1* | 11/2017 | Wang | H04W 52/0206 |

OTHER PUBLICATIONS

Chenfei Gao et al.—"Relax, But Do Not Sleep: A New Perspective on Green Wireless Networking" pp. 907-915 IEEE INFOCOM 2014—IEEE Conference on Computer Communications Apr. 27, 2014-May 2, 2014 consisting of 9-pages.
Lexi Xu et al., "Channel-Aware Optimised Traffic Shifting in LTE-Advanced Relay Networks" Sep. 2, 2014 IEEE 25th International Symposium on Personal, Indoor and Mobile Radio Communications, consisting of 6 pages.
International Search Report and Written Opinion dated May 19, 2017 issued in corresponding PCT Application No. PCT/IB2016/054430, consisting of 18 pages.
Invitation to Pay Additional Fees and, Where Applicable, Protest Fee dated Mar. 22, 2017 issued in corresponding PCT Application No. PCT/IB2016/054430, consisting of 9 pages.
First Examination Report for Indian Patent Application No. 201937000197 dated Aug. 31, 2020, 5 pages (including English translation).

* cited by examiner

| BS Id | Relation Priority |
|-------|-------------------|
| BS20C | 1 |
| BS20B | 2 |
| BS20D | 3 |
| BS20E | 4 |

BS20A

DECENTRALIZED BASE STATION LOAD BALANCING AND POWER

CROSS-REFERENCE TO RELATED APPLICATIONS

This application is a Submission Under 35 U.S.C. § 371 for U.S. National Stage Patent Application of International Application Number: PCT/IB2016/054430, filed Jul. 25, 2016 entitled "DECENTRALIZED BASE STATION LOAD BALANCING AND POWER," the entirety of which is incorporated herein by reference.

TECHNICAL FIELD

The disclosure is related to wireless communication, and in particular, to load balancing and load consolidation via a serving base station that prioritizes relationships with target base stations in a wireless communication system.

BACKGROUND

In a typical wireless communication system, wireless devices communicate via a radio access network (RAN) with other wireless devices and core networks. FIG. 1 is a block diagram of such a typical wireless communication system 10 including a core network 12, multiple base stations 14 and multiple wireless devices 16. The core network 12 may include intermediary devices such as a mobile management entity (MME) or serving gateway (S-GW). The core network provides connections to external networks such as the Internet and the Public Switched Telephone Network (PSTN). The base stations 14 may cover different geographic regions called cells which may overlap. Thus, a wireless device 16 may communicate over the air, i.e., wirelessly, with one or more base stations to communicate voice and data between the wireless device 16 and another wireless device, a landline telephone and/or the Internet. Using wireless communication standards such as the 3rd Generation Partnership Project (3GPP) Long Term Evolution (LTE) standards, the base stations 14 may communicate with each other over an X2 interface and communicate with the core network 12 over an S1 interface.

The term wireless device or mobile terminal used herein may refer to any type of wireless device communicating with a network node, such as a base station, and/or with another wireless device in a cellular or mobile communication system. Examples of a wireless device include user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term base station, e.g. a Radio Base Station (RBS), sometimes may be referred to herein as, e.g., evolved NodeB "eNB", "eNodeB", "NodeB", "B node", or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. In the context of this disclosure, downlink (DL) refers to the transmission path from the base station 14 to the wireless device 16. Uplink (UL) refers to the transmission path in the opposite direction, i.e., from the wireless device 16 to the base station 14. In 3GPP LTE, base stations 14 may be directly connected to one or more core networks 12.

The number of people and machines using wireless communications is large and growing. With this increase, the number of base stations must increase to handle the increased load. This costs money for original installation (deployment costs) and continuing operations (running costs). Running costs may be affected by traffic patterns. Traffic patterns depend on many factors, for example, time of day, days per week, season of the year and particular occasions such as special events. Too few base stations will not meet peak demand, while too many base stations will result in unused resources and therefore wasted running costs. Excess base stations also create interference to neighboring base stations and adversely impact the environment due to radiation. Some conventional approaches to compensating for misalignment between traffic and available base station resources involve central control to coordinate actions of multiple base stations and further may not provide satisfactory power saving, interference reduction and are complex.

SUMMARY

Some embodiments advantageously provide a method and base station for distributing wireless device traffic load in a wireless communication system having a plurality of base stations. According to one aspect, a method includes determining a wireless device traffic load on a serving base station of the plurality of base stations. The method also includes determining a priority for each of a plurality of target base stations of the plurality of base stations, the priority being based at least in part on a number of wireless devices being served by the serving base station that receive a signal from a corresponding target base station that exceeds a threshold. The method further includes, when a determination is made to change a load on the serving base station based on a comparison of the load on the serving base station to a load change threshold, sending a load change request to a target base station having a highest priority.

According to this aspect, in some embodiments, the load change threshold is a load balancing threshold and when the comparison indicates that the load exceeds the load balancing threshold, the load change request is a load balancing request, requesting that the target base station is to receive handover of at least one wireless device currently served by the serving base station. In some embodiments, the method further includes receiving a load balancing accept message indicating that the target base station can accept handover of at least one wireless device currently served by the serving base station. In some embodiments, the method further includes receiving a load balancing reject message indicating that a load on the target base station exceeds an admission control threshold. In some embodiments, the method further includes sending a load balancing request to an alternate target base station which has a next highest priority. In some embodiments, the load change threshold is a load consolidation threshold and when the comparison indicates that the load is less than the load consolidation threshold, the load change request is a load consolidation request, requesting that the target base station is to receive handover at least one wireless device currently served by the serving base station. In some embodiments, the method further includes receiving a load consolidation accept message indicating that the target base station will receive handover at least one wireless device currently served by the severing base station. In some embodiments, the method further includes handing over wireless devices from the serving base station until a message is received that the load on the target base station has reached an admission control threshold. In some embodiments, the method further includes sending a load consolidation request to an alternate target base station which has a next highest priority when no further wireless devices can be handed over to the target base station. In some embodiments, when there are no further target base stations for which priority is determined, the method includes sending a second load consolidation request to the target base station after an elapsed period of time.

According to another aspect, a serving base station configured to distribute wireless device traffic load in a wireless communication system having a plurality of base stations is provided. The serving base station includes processing circuitry including a memory and a processor. The memory is configured to store a priority for each of a plurality of target base stations of the plurality of base stations and at least a threshold. The processor is configured to determine a load on the serving base station. The processor is also configured to determine a priority for each of at least one target base station of the plurality of base stations, the priority being based on a number of wireless devices being served by the serving base station that receive a signal from a target base station that exceeds a threshold. The processor is further configured so that, when a determination is made to change a load on the serving base station based on a comparison of the load of the serving base station to a load change threshold, a load change request is sent to a target base station having a highest priority.

According to this aspect, in some embodiments, the load change threshold is a load balancing threshold and when the comparison indicates that the load exceeds the load balancing threshold, the load change request is a load balancing request, requesting the target base station to receive handover of at least one wireless device currently served by the serving base station. In some embodiments, the processor is further configured to receive a load balancing accept message indicating that the target base station can accept handover of at least one wireless device currently served by the serving base station. In some embodiments, the processor is further configured to receive a load balancing reject message indicating that a load on the target base station exceeds an admission control threshold. In some embodiments, the processor is further configured to send a load balancing request to an alternate target base station which has a next highest priority. In some embodiments, the load change threshold is a load consolidation threshold and when the comparison indicates that the load is less than the load consolidation threshold, the load change request is a load consolidation request, requesting the target base station to receive handover at least one wireless device currently served by the severing base station. In some embodiments, the processor is further configured to receive a load consolidation accept message indicating that the target base station will accept handover at least one wireless device currently served by the serving base station. In some embodiments, the processor is further configured to handover wireless devices served by the serving base station until a message is received that the load on the target base station has reached an admission control threshold. In some embodiments, the processor is further configured to send a load consolidation request to an alternate target base station which has a next highest priority when no further wireless devices can be handed over to the target base station. In some embodiments, the processor is further configured, when there are no further target base stations for which priority is determined, to send a second load consolidation request to the target base station after an elapsed period of time.

According to yet another aspect, a serving base station is configured to distribute wireless device traffic load in a wireless communication system having a plurality of base stations. The serving base station includes a memory module configured to store a priority for each of a plurality of target base stations of the plurality of base stations and at least a threshold. The serving base station also includes a load determination module configured to determine a load on the serving base station. A priority determination module is configured to determine a priority for each of at least one target base station, the priority being based on a number of wireless devices being served by the serving base station that receive a signal from a target base station that exceeds a threshold. A load change message module is configured to send a load change request to a target base station having a highest priority when a determination is made to change the load of the serving base station based on a comparison of the load on the serving base station to a load change threshold.

According to this aspect, in some embodiments, the load change threshold is a load balancing threshold and when the comparison indicates that the load exceeds the load balancing threshold, the load change request is a load balancing request, requesting the target base station to receive handover of at least one wireless device currently served by the serving base station. In some embodiments, the load change threshold is a load consolidation threshold and when the comparison indicates that the load is less than the load consolidation threshold, the load change request is a load consolidation request, requesting the target base station to receive handover at least one wireless device currently served by the serving base station.

According to another aspect, a method for distributing wireless device traffic load in a wireless communication system among a plurality of carriers is provided. The method includes determining a wireless device traffic load on a serving carrier of the plurality of carriers. The method further includes determining a priority for each of a plurality of target carriers of the plurality of carriers, the priority being based at least in part on a number of wireless devices being served by the serving carrier that receive a signal on a target carrier that exceeds a threshold. The method also includes determining whether to change the load of the serving carrier to a target carrier having a highest priority based on a comparison of the load on the serving carrier (20) to a load change threshold.

According to another aspect, a base station is configured to distribute wireless device traffic load in a wireless communication system among a plurality of carriers. The base station includes processing circuitry including a memory and a processor. The memory is configured to store a priority for each of a plurality of target carriers and at least a threshold. The processor is configured to determine a load on a serving carrier, determine a priority for each of a plurality of target carriers of the plurality of carriers, the priority being based at least in part on a number of wireless devices (16) being served by the serving carrier that receive a signal on a target carrier that exceeds a threshold. The processor is also configured to determine whether to change the load of the serving carrier to a target carrier having a highest priority based on a comparison of the load on the serving carrier to a load change threshold.

According to yet another aspect, a base station is configured to distribute wireless device traffic load in a wireless communication system among a plurality of carriers. The base station includes a memory module configured to store a priority for each of a plurality of target carriers and at least a threshold. The base station includes a load determination module configured to determine a load on a serving carrier. The base station further includes a priority determination module configured to determine a priority for each of a plurality of target carriers of the plurality of carriers, the priority being based at least in part on a number of wireless devices being served by the serving carrier that receive a signal on a target carrier that exceeds a threshold. The base station includes a load change module configured to determine whether to change the load of the serving carrier to a target carrier having a highest priority based on a comparison of the load on the serving carrier to a load change threshold.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
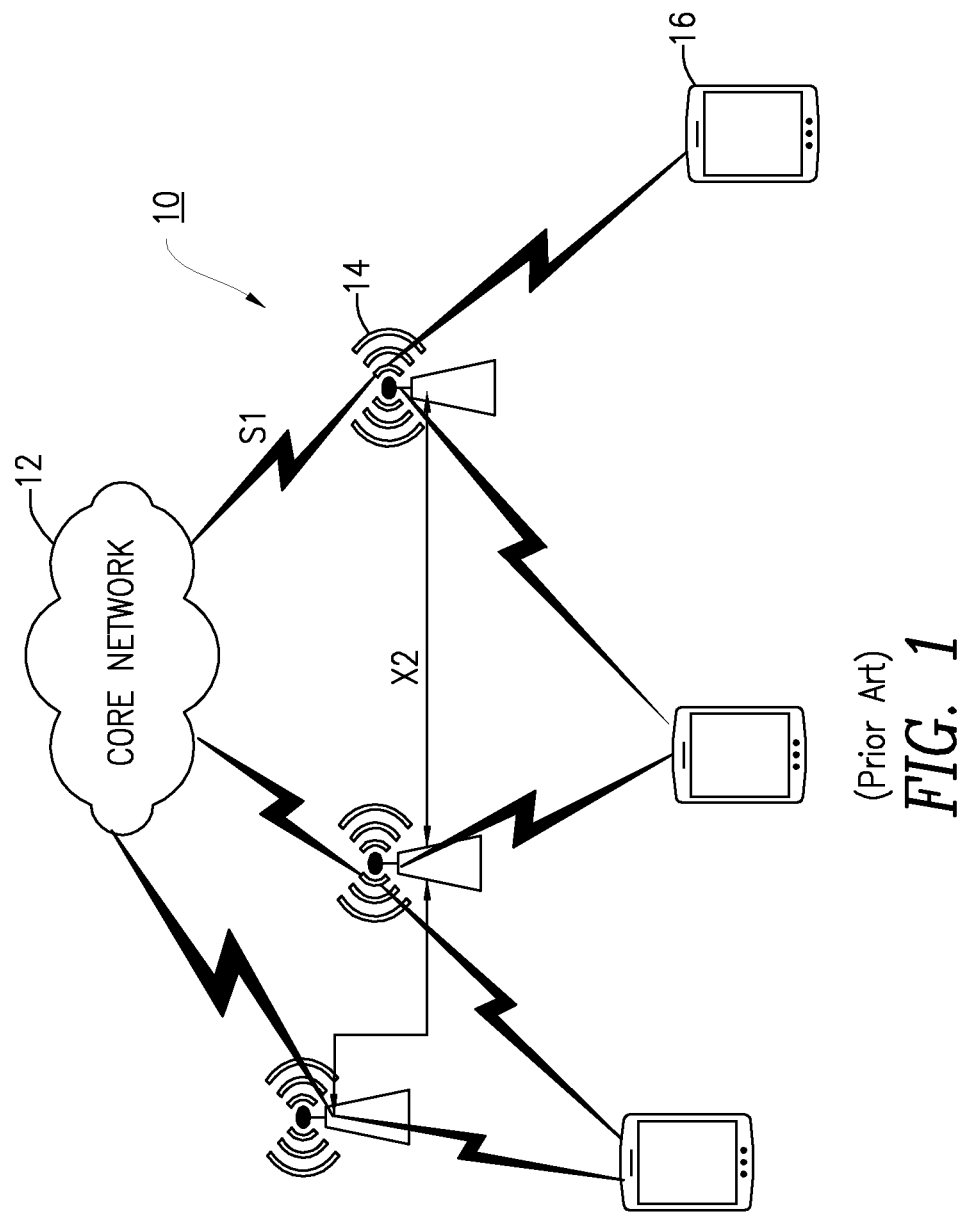
FIG. 1 is a block diagram of a known wireless communication system.

Before describing in detail exemplary embodiments, it is noted that the embodiments reside primarily in combinations of apparatus components and processing steps related to load balancing and load consolidation in a wireless communication system. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some embodiments provide a self-organizing method to manage network traffic. In such embodiments, load balancing is employed when there is too much traffic on some base stations and low traffic on other base stations. This enables the existing base stations to serve more wireless device more efficiently. In load balancing, wireless devices being served by a heavily loaded base station are handed over to less-heavily loaded base stations. In self-organizing networks according to embodiments described herein, load consolidation is employed when there is too little traffic on some base stations. Load consolidation involves moving wireless devices from a weakly loaded base station to another base station and placing the weakly loaded base station in a reduced power mode. This reduces overall power consumption, running costs and interference.

Thus, some embodiments manage base stations automatically without a central controller, optimally accommodate peak traffic and consolidate resources during times of low traffic. This reduces running costs including the cost of monitoring and manually distributing loads, as well as reducing power consumption. Interference is reduced by load consolidation as fewer base stations are in operation. In some cases, when a load on a base station is reduced during times when it is already weakly loaded, the further reduction in load enables greater use of discontinuous transmission (DTX) to further reduce power consumption. Also, by load balancing and load consolidation, preemption of low priority users by higher priority users may be avoided. Some embodiments achieve load balancing and load consolidation by signaling on the X2 interface between base stations and no signaling between the base station and a wireless device is required to achieve the redistribution besides normal handover signaling.

In a self-organized network according to some embodiments described herein, each base station works together with neighboring base stations to achieve load balancing and load consolidation, resulting in load optimization in the network. Each base station of a plurality of base stations is capable of measuring the base station's load, represented by a load index. Methods for measuring a base station's load are known, such as methods based on requested traffic, scheduled resources, and throughput. Such methods are not detailed here. Any method for measuring load and determining a load index may be used in embodiments described herein.

Figure 2:
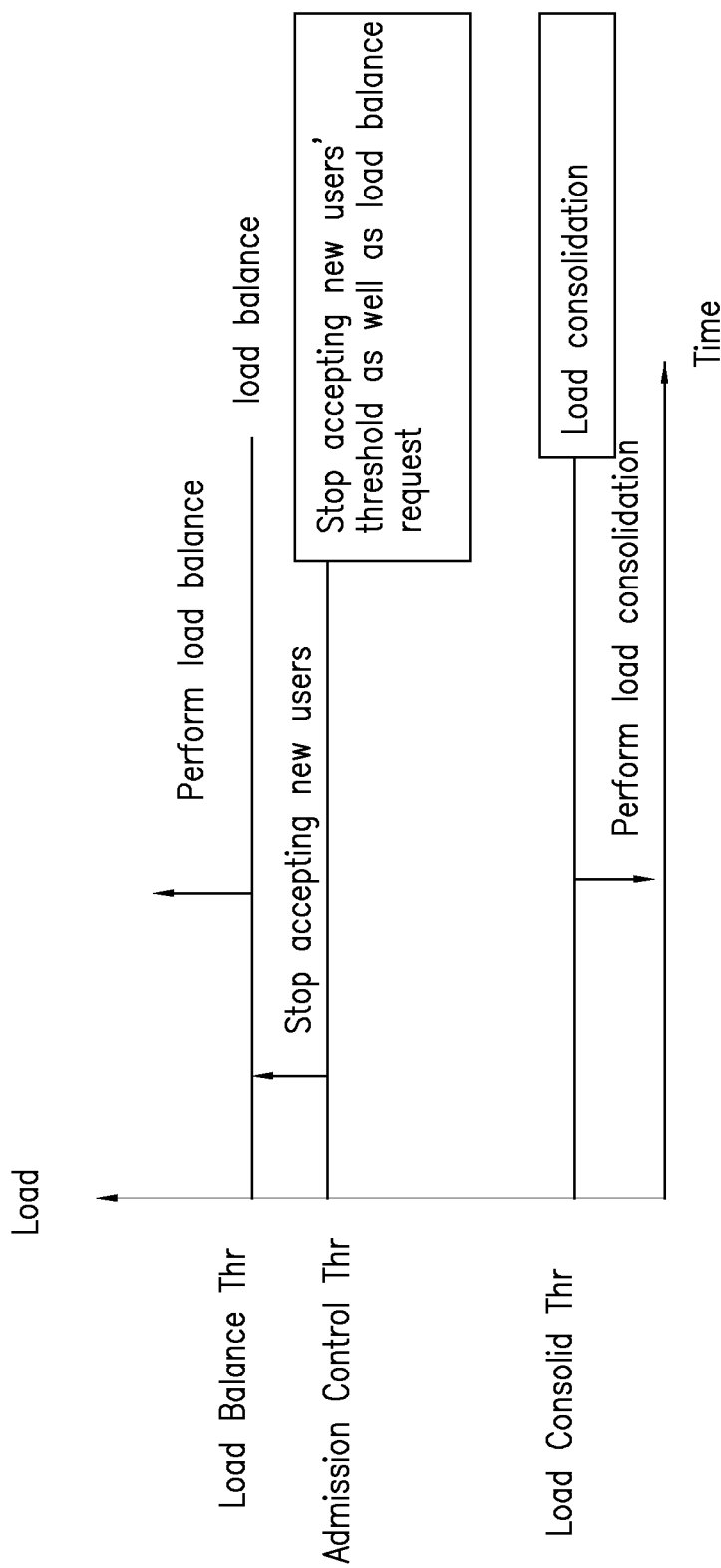
FIG. 2 is a diagram showing thresholds for load balancing and load consolidation.

FIG. 2 is a diagram of load thresholds which determine whether a base station will perform load balancing or load consolidation. For example, when the load index at a base station falls below a lower threshold, LoadConsolidThr, which is a load consolidation threshold, the base station will perform load consolidation. When the load index on a base station exceeds a first upper threshold, AdmissionControlThr, which is an admission control threshold, the base station will cease to admit new wireless devices. When the load index on the base station exceeds a second upper threshold, LoadBalanceThr, which is a load balancing threshold, the base station will perform load balancing. The gap between the admission control threshold and the load balancing threshold avoids a ping pong effect of switching back and forth between load balancing (i.e., handing over currently served wireless devices to a target base station) and accepting new wireless devices. Note that the thresholds may be different for different base stations or the same for all of a set of base stations.

Each base station of a plurality of base stations is equipped with a method and mechanism for establishing a priority value of each other base station. These priority values may be referred to as relationships between a serving base station and its neighbor or target base stations. The target base station having the strongest relationship with the serving base station may be considered first before other base stations when performing load consolidation and load balancing.

Several methods may be employed to determine a priority of relationship between a serving base station and target base stations. In some embodiments, a priority of relationship between a serving base station and a target base station is based on a number of wireless devices served by the serving base station that receive a signal from the target base station at a signal to interference plus noise ratio (SINR) that exceeds an SINR threshold. The larger this number is, the stronger the relationship and the higher the priority of the target base station with respect to the serving base station. The signal strength upon which the determination of relationship and priority is based may be other than SINR such as, for example, reference signal received power (RSRP). Herein, a wireless device of the serving base station that receives a signal from a target base station that exceeds a threshold power level such as an SINR threshold is referred to as a qualifying wireless device.

Figure 3:
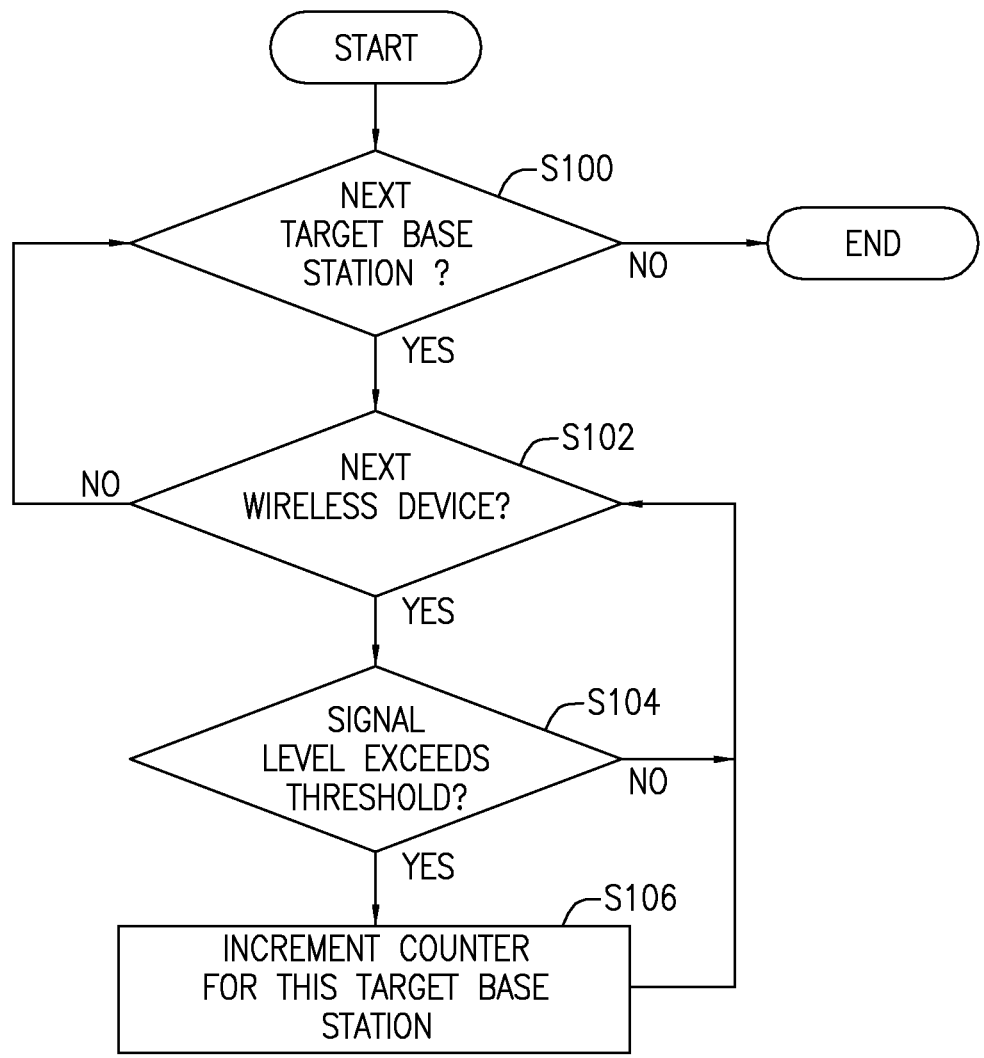
FIG. 3 is a flowchart of an exemplary process for determining priorities for a plurality of target base stations.

A process for determining the number of qualifying wireless devices corresponding to a target base station is shown in FIG. 3. The process includes selecting a target base station for which wireless devices of the serving base station are to be evaluated (block S100). The process includes determining if any wireless devices of the serving base station have not already been considered (block S102). If so, a measure of signal power or signal quality of a signal received by the wireless device from the target base station currently being considered is compared to a threshold (block S104). If the signal exceeds the threshold, a counter for the currently-considered target base station is incremented (block S106) and the wireless device is considered to be a qualifying wireless device with respect to the currently-considered target base station.

Thus, after all target base stations are considered, there will be a counter value for each target base station. The counter value for a target base station may therefore indicate a number of the serving base station's wireless devices that receive a signal exceeding a threshold from the target base station. A target base station having the highest counter value may be considered the target base station having a highest priority.

Figure 4:
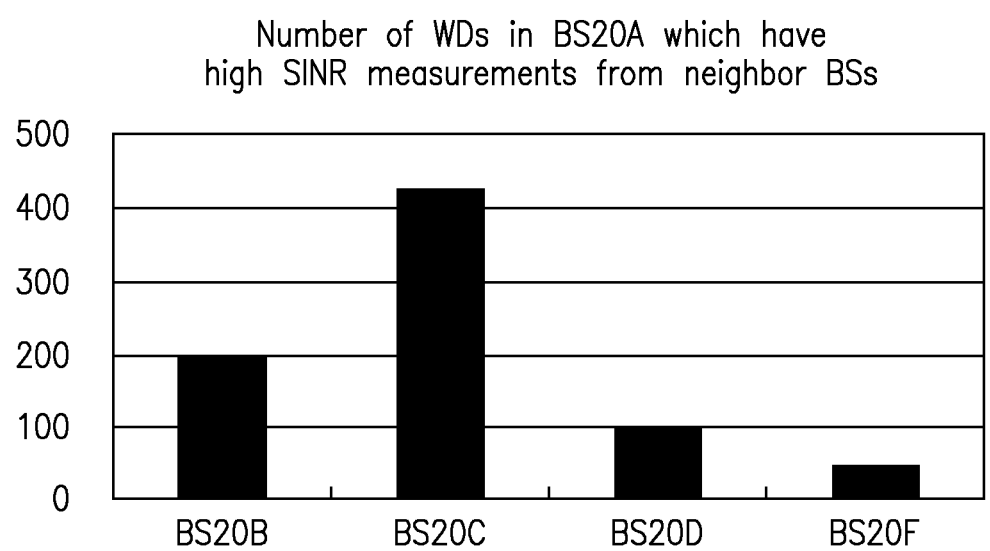
FIG. 4 is a bar graph of an example configuration of target base stations having priorities with respect to a serving base station.

FIG. 4 is a chart of an example outcome of the process of FIG. 3 for a hypothetical network of radio base stations. In particular, the chart of FIG. 4 shows a number of wireless devices (WD) 16 served by a base station BS 20A which have high SINR measurements from neighbor base stations, BSs 20B-20E. Along the horizontal axis, a bar for each of base stations BS 20B-20E is shown, where the height of a bar corresponds to the number of wireless devices receiving a signal from the respective base station that exceeds an SINR threshold, i.e., the number of qualifying devices for the respective base station. In this example, target base station BS 20C has the highest number of qualifying wireless devices. Base stations 20A-20E are collectively referred to herein as base station 20.

Figure 5:
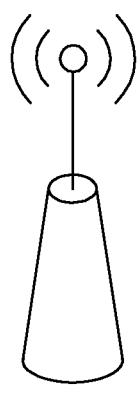
FIG. 5 is a table of priorities of target base stations according to the example of FIG. 4.

Continuing the example, FIG. 5 is a table listing each base station identification BS 20B-20E in the order of highest number of qualifying wireless devices to lowest. This data may be stored in memory in the serving base station BS 20A. In some embodiments, a counter value that contains the number of wireless devices of the serving base station BS 20A having sufficiently high reception of signals from a target base station is stored in association with an identity of the target base station to which the counter value corresponds. Thus, a serving base station BS 20A may store an array having, for each target base station 20B-20E, a target base station identifier, that target base station's counter value and an identity of the qualifying wireless devices for that target base station. Although embodiments are described with reference to base stations 20, it is understood that embodiments can be implemented in or across any suitable network node, of which base stations are a type. Network nodes which may implement the features and functions described herein may include a radio network node such as a base station, a radio base station, a base transceiver station, a base station controller, a network controller, an evolved Node B (eNB), a Node B, a Multi-cell/multicast Coordination Entity (MCE), a relay node, an access point, a radio access point, a Remote Radio Unit (RRU) Remote Radio Head (RRH), a core network node (e.g., Mobile Management Entity (MME), a Self-Organizing Network (SON) node, a coordinating node, a positioning node, a Minimization of Drive Tests (MDT) node, etc.), or even an external node (e.g., 3rd party node, a node external to the current network), wireless access point, etc. The functions described herein may also be distributed among multiple base stations or network nodes.

As noted above, the target base station having the strongest relationship with the serving base station may be considered first before other base stations when handing over wireless devices for load balancing and load consolidation. Thus, for the example of FIG. 5, base station BS 20C may be the first base station to receive wireless devices handed over from the serving base station BS 20A when performing load balancing and load consolidation.

FIG. 5 also indicates that BS 20B will be second in line, behind BS 20C, to receive wireless devices handed over from the serving base station BS 20A during load rebalancing and will be the second in line, behind BS 20C to receive wireless devices from the serving base station BS 20A during load consolidation. Thus, during load rebalancing, when the admission threshold of BS 20C is reached, no further handovers to BS 20C will occur and if further wireless devices are to be handed over to complete load balancing, the further handovers will be from BS 20B. Although FIGS. 4 and 5 refer to five base stations 20, it is understood that implementations are not limited to five base stations 20. Implementations can include more or fewer than five base stations 20 and can include any number of wireless devices 16.

The ordered list of target base stations 20, such as the table in FIG. 5, may be referred to as the neighbor relation priority (NRP) table 21. The NRP table 21 may be updated periodically or after a predetermined period of time or when new measurements of signal quality or power have been obtained. For example, when a wireless device 16 moves to a cell edge, the wireless device may automatically send a new measurement of signal power from a neighboring base station 20 to the serving base station 20. The serving base station may also instruct the wireless devices it serves to send measurement reports when the load on the serving base station 20 exceeds the admission threshold and when the load on the serving base station 20 is below the consolidation threshold. The NRP table may also be updated when a load balance operation or a load consolidation operation is completed. The updating may be done each time another individual wireless device measures an SINR higher than a threshold and reports this to a base station 20. Or the updating may be done only after reception of a number of newly reporting wireless devices 16 exceeds a threshold.

In some embodiments, a target base station 20 may also be selected for load balancing or load consolidation only if the number of qualifying wireless devices exceeds a quantity threshold. Thus, a target base station 20 in the NRP table may be bypassed if the number of qualifying wireless devices corresponding to the target base station 20 is below the quantity threshold.

When a load on the serving base station 20 exceeds the load balancing threshold, the serving base station 20 may send a load balance request to a target base station 20 in the NRP table of the serving base station 20. When the target base station 20 receives the load balance request, the target base station 20 determines whether the load index of the target base station 20 is below the admission control threshold of the target base station 20. If the load index of the target base station 20 exceeds the admission control threshold of the target base station 20, a load balance rejection message is sent from the target base station 20 to the serving base station 20 indicating to the serving base station 20 that the target base station 20 is not able to receive handover of wireless devices from the serving base station 20 to the target base station 20. In this case, the serving base station 20 will select the target base station 20 from the NRP table having the next highest priority.

If, on the other hand, the load index of the target base station 20 is below the admission control threshold of the target base station 20, a load balance accept message is sent from the target base station 20 to the serving base station 20 indicating to the serving base station 20 that the target base station 20 is able to receive handover of wireless devices from the serving base station 20. In this case, handover of wireless devices from the serving base station 20 to the target base station 20 may continue until a number of wireless devices served by the serving base station 20 falls below the admission control threshold of the serving base station 20 or until the load index of the target base station 20 reaches the admission control threshold of the target base station 20.

When a load index of the serving base station 20 falls below the load consolidation threshold, the serving base station 20 sends a load consolidation request to the target base station 20. If the load index of the target base station 20 is below the admission control threshold, the serving base station 20 hands over wireless devices to the target base station 20 until the serving base station 20 has no more wireless devices, in which case the serving base station 20 is powered down, or until the admission control threshold of the target base station 20 is reached, in which case, the serving base station 20 selects the next target base station 20 in the NRP table to which wireless devices of the serving base station 20 are to be handed over.

If none of the target base stations 20 in the NRP table accept a load balance request from the serving base station 20, no load balancing can be performed because the existing load on the network is already high. In this case a notice to the network operator may be sent to indicate that a powered down base station 20 should be powered up. Alternatively, in some embodiments, the powering up of a powered down base station 20 may occur automatically upon determining that no target base stations 20 in the NRP table can accept a load balancing request.

If none of the target base stations 20 in the NRP table accept a load consolidation request from the serving base station 20, no load consolidation can be performed because the existing load on the network is already high. In this case, the serving base station 20 may wait for a period of time, T, before sending another load consolidation request to the target base stations 20 in the NRP table of the serving base station 20. Note also that in some embodiments no new wireless devices are admitted to the base station 20 which is in the process of load consolidation to avoid a "ping pong" effect.

Figure 6:
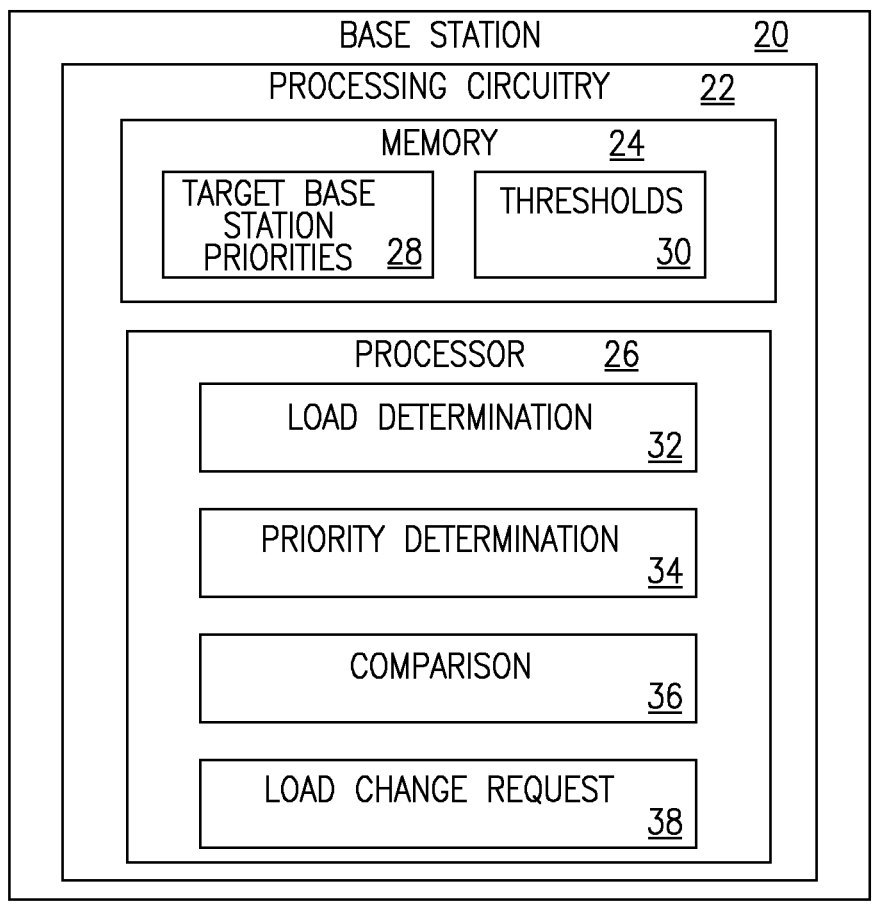
FIG. 6 is a block diagram of a base station that can function as a serving node capable of performing load balancing and load consolidation.

FIG. 6 is a block diagram of a base station 20 functioning as a serving base station 20 capable of assessing a relation priority for each of at least one target base station 20 and capable of performing load balancing and load consolidation. The base station 20 operating as a serving base station 20 includes processing circuitry 22. The processing circuitry 22 may have a memory 24 and a processor 26. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may comprise and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store target base station priorities 28 and thresholds 30. The target base station priorities 28 may be based on a number of qualifying wireless devices per target base station 20 as described above. The thresholds 30 include the load balance threshold, the load consolidation threshold and the admission threshold described above. The processor 26, operating under the direction of software instructions stored in the memory 24, implements a load determination unit 32, a priority determination unit 34, a comparison unit 36 and a load change message unit 38.

The load determination unit 32 may implement any method, known or to be developed, for determining a load on the serving base station 20. For example, a load index may be proportional to a number of wireless devices being served by the serving base station 20. The priority determination unit 34 includes determining a priority for each of at least one target base station 20. The priority for a target base station 20 may be based on the number of wireless devices served by the serving base station 20 that receive a signal from the target base station 20 that exceeds a threshold, such as power threshold of which a SINR is one example. The comparison unit 36 includes comparing the load index determined by the load determination unit 32 to the load balance threshold, the admission threshold and the load consolidation threshold. The load change message unit 38 originates a load change request to be sent to a target base station 20 when the comparison unit 36 indicates that the load balance threshold is exceeded or that the load consolidation threshold exceeds the current base station load.

Figure 7:
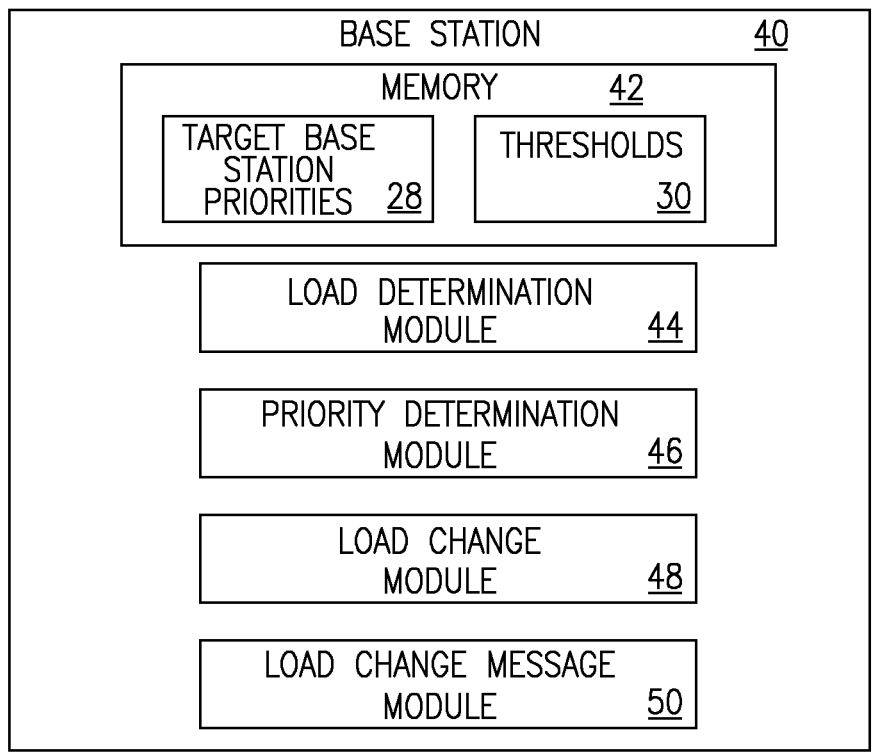
FIG. 7 is a block diagram of an alternative base station capable of performing load balancing and load consolidation.

An alternative embodiment of a base station 40 functioning as a serving base station is shown in FIG. 7. The serving base station 40 has a memory module 42 that stores target base station priorities 28 and thresholds 30. The serving base station 40 also includes software modules having software instructions executable by a processor to perform load determination 44, priority determination 46, load change determination based on threshold comparison 48 and load change messaging 50.

Figure 8:
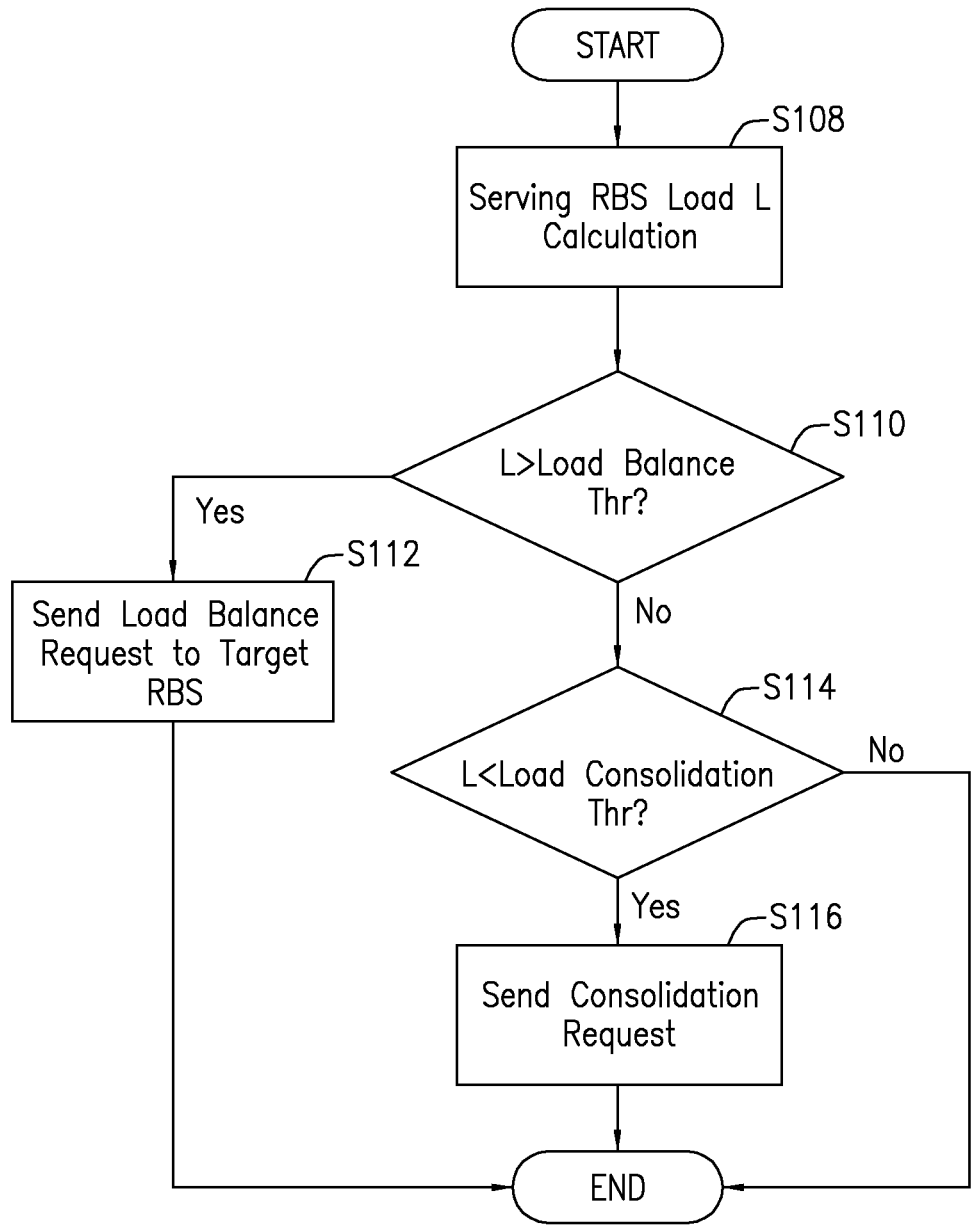
FIG. 8 is a flowchart of an exemplary process for determining whether to perform load balancing and load consolidation.

FIG. 8 is a flowchart of an exemplary embodiment of determining by a serving base station 20 or 40 whether to perform load balancing or load consolidation. The process includes determining, by the load determination unit 32 or load determination module 44, a serving base station load calculation to calculate a load L on the serving base station 20 (block S108). The calculated load L is compared to a load balance threshold by the comparison unit 26 (block S110). If the load L exceeds the load balance threshold, the serving base station 20 sends a load balance change request to a target base station 20 via the load change message unit 38 (block S112). Otherwise, the load L is compared to a load consolidation threshold by the comparison unit 36 (block S114). If the load L is less than the load consolidation threshold, a load consolidation request message is sent to a target base station 20 (block S116).

Figure 9:
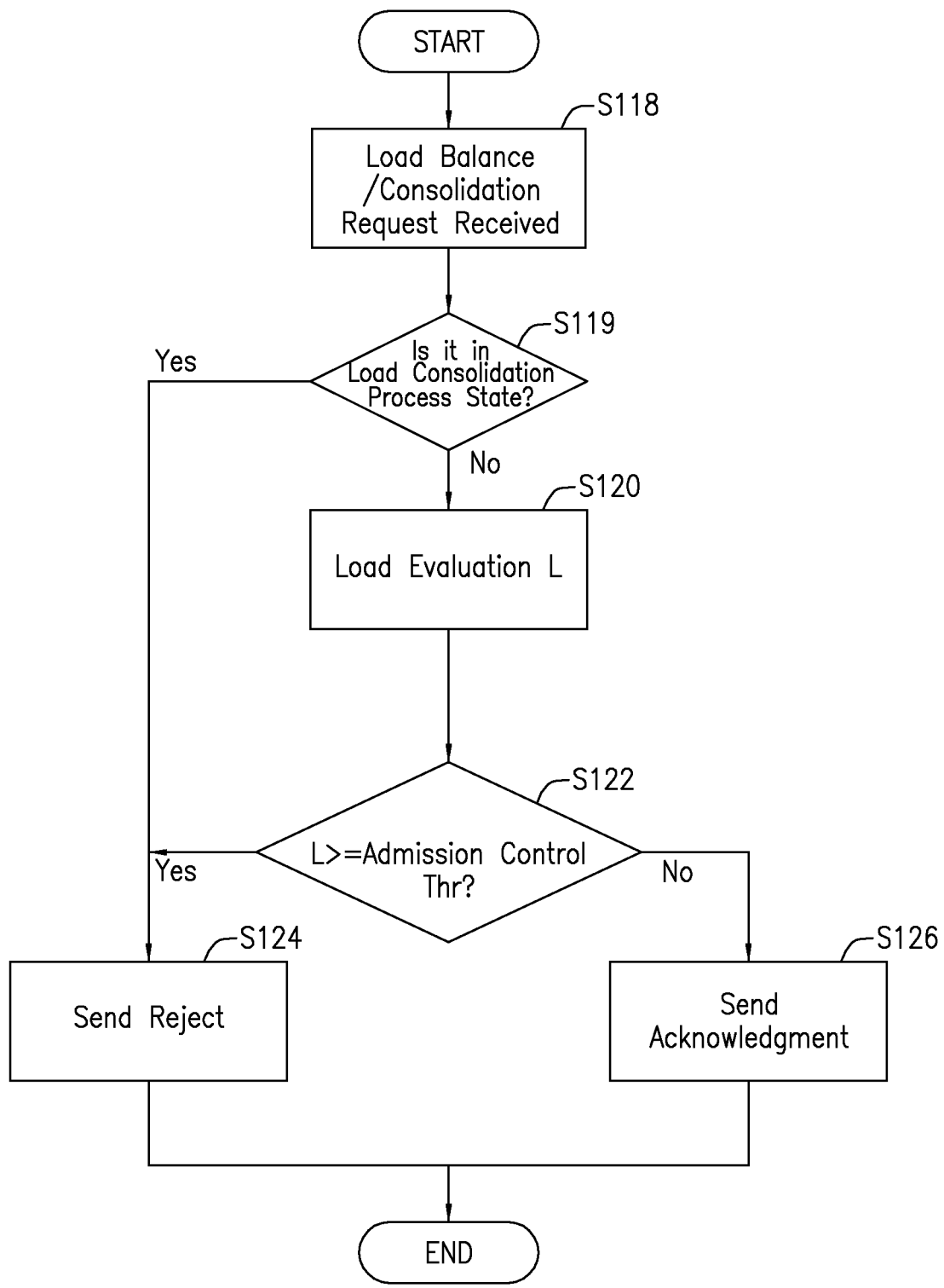
FIG. 9 is a flowchart of an exemplary process for responding to a load change request received from a serving base station.

FIG. 9 is a flowchart of an exemplary process for determining, at a target base station 20, how to respond to a load change request from a serving base station 20. The process includes receiving, via a load change message unit 38, a load change request that may be a load balance request or a load consolidation request (block S118). If the target base station 20 is in a load consolidation state (block S119), a reject response is sent to the serving base station (block S124). Otherwise, the target base station 20 calculates a load L on the target base station 20 via a load determination unit 32 (block S120). The load L of the target base station 20 is compared to an admission threshold via a comparison unit 36 (block S122). If the load L of the target base station 20 exceeds the admission threshold, a reject message is sent from the target base station 20 to the serving base station 20 via the load change message unit 38 (block S124). Otherwise, the target base station 20 sends an acknowledgment message via the load change message unit 38 to the serving base station 20 indicating the ability of the target base station 20 to receive wireless device from the serving base station 20 (block S126).

Figure 10:
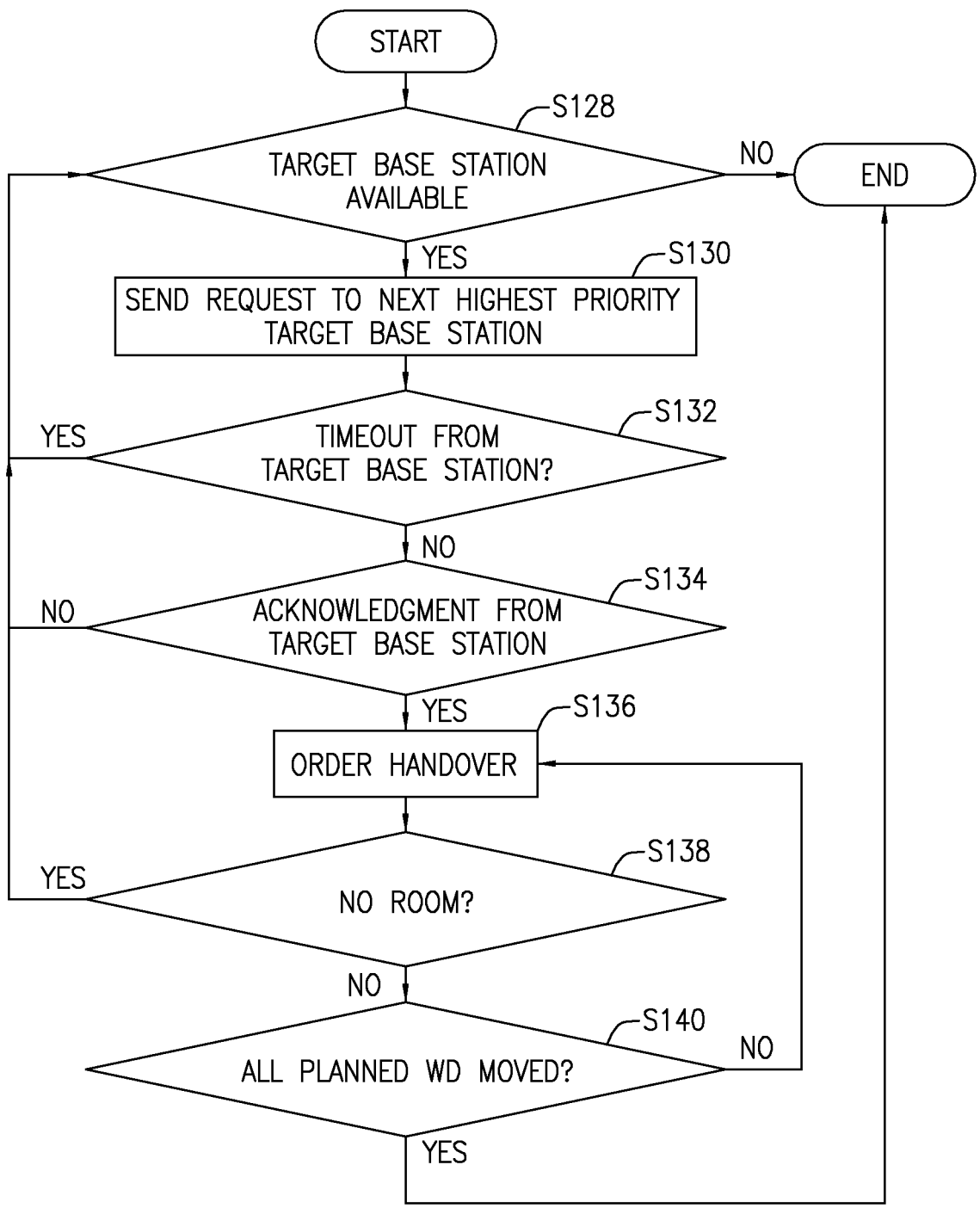
FIG. 10 is a flowchart of an exemplary process for performing handover to achieve load balance and/or load consolidation.

FIG. 10 is a flowchart of an exemplary process for implementing a load balance or load consolidation. The process includes determining if a target base station 20 is available based on the determinations made by the priority determination unit 34 (block S128). If not, then no load balancing or consolidation is performed at this time. If a target base station 20 is available, a request is sent to the target base station 20 having the highest priority via the load change message unit 38 (block S130). If a predetermined period of time elapses before the target base station 20 responds to the request, (block S132), a determination is made whether a next highest priority target base station 20 is available via the priority determination unit 34 (block S128). On the other hand, if an acknowledgement from the target base station 20 is received by the serving base station 20 (block S134) a handover is initiated by the serving base station processing circuitry 22 (block S136) to handover a qualifying wireless device to the target base station 20. If there is room for further handovers at the target base station 20 (block S138), then a determination is made by the processing circuitry 22 whether all planned wireless devices have been moved to a target base station 20 (block S140). If not, a next handover is initiated (block S136). Otherwise, the process ends. Returning to block S138, if there is no room at the current target base station 20, then a determination is made whether a target base station 20 having a next highest priority is available via the priority determination unit 24 (block S128).

Figure 11:
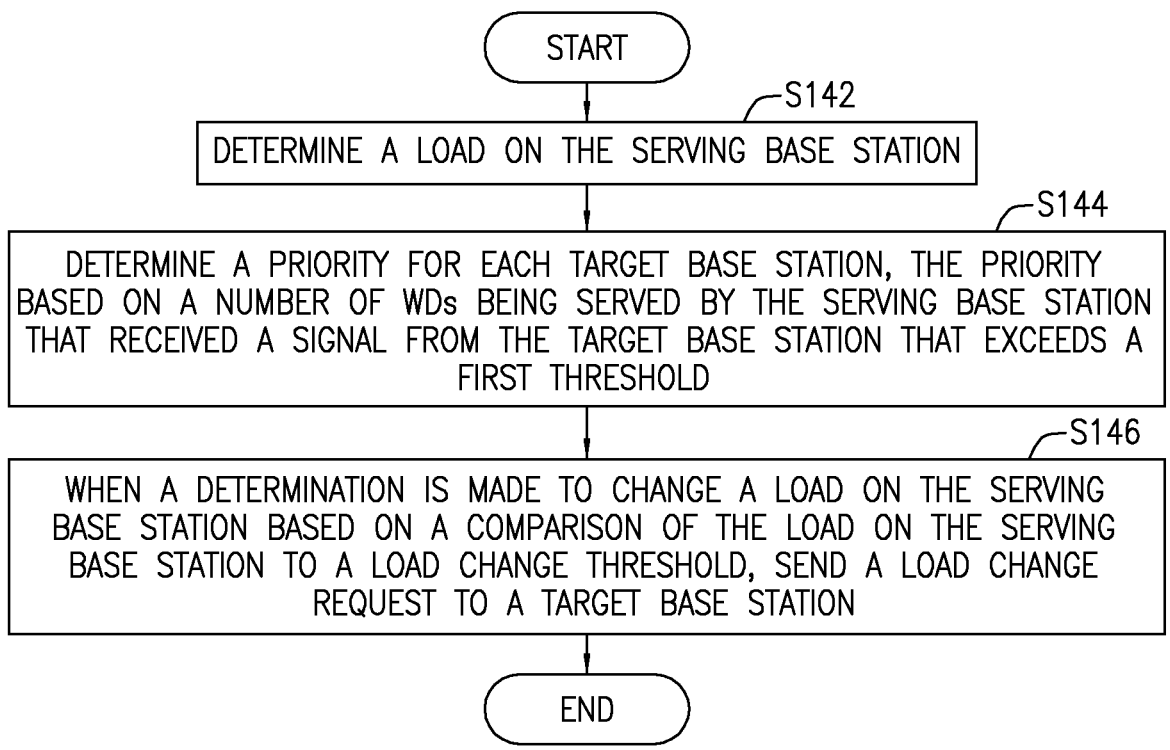
FIG. 11 is a flowchart of an exemplary process for distributing wireless device traffic load.

FIG. 11 is a flowchart of an exemplary process performed by the serving base station 20 for distributing wireless device traffic load in a wireless communication system having a plurality of base stations 20. The process includes determining a load on a serving base station 20 via the load determination unit 32 (block S142). The process further includes determining a priority for each target base station 20 via the priority determination unit 34, where the priority is based on a number of wireless devices being served by the serving base station 20 that exceeds a first threshold (block S144). The processor is further configured so that, when a determination is made to change a load on the serving base station 20 based on a comparison of the load on the serving base station to a load change threshold, a load change request is sent via the load change message unit 38 to the target base station 20 (block S146).

Figure 12:
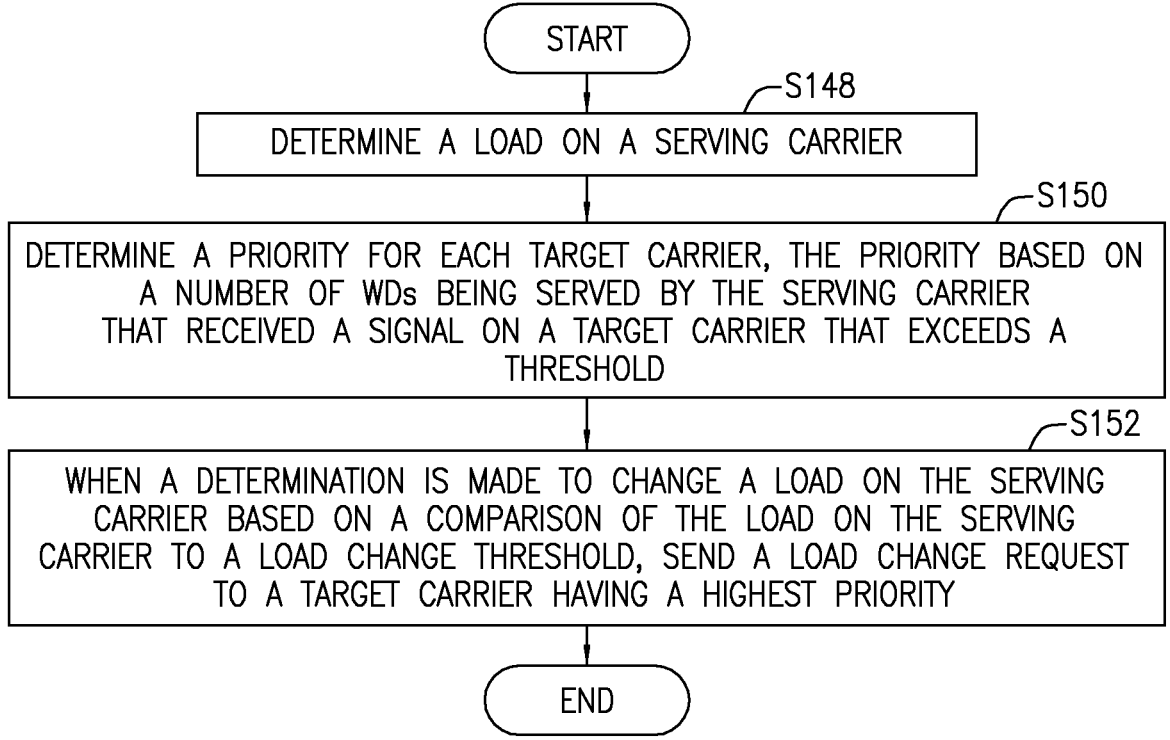
FIG. 12 is a flowchart of an exemplary process for distributing wireless device traffic load among a plurality of carriers.

Note that the above-described load balancing and load consolidation procedures can be applied to balance and consolidate loads on a per carrier basis or a per cell basis. Thus, for example, when use of a carrier exceeds a load balance threshold, a wireless device 16 assigned to the carrier on a base station 20 may be handed over to another carrier on the base station 20, etc. Such a process is shown in FIG. 12. More particularly, a method for distributing wireless device traffic load among a plurality of carriers includes determining, by the processing circuitry 22, a wireless device traffic load on a serving carrier of a plurality of carriers (block S148). The process includes determining, by the processing circuitry 22, a priority for each of a plurality of target carriers, the priority being based at least in part on a number of wireless devices (16) being served by the serving carrier that receive a signal on a target carrier that exceeds a threshold (block S150). The process also includes, when a determination is made to change a load on the serving carrier based on a comparison of the load of the serving carrier to a load change threshold, a load change request is sent to a target carrier having a highest priority (block S152).

It is noted that these steps can also be performed by the modules 42-48 of the base station 40 shown in FIG. 7. For example, the memory module 42 may be configured to store a priority for each of a plurality of target carriers and at least a threshold. The load determination module 44 may be configured to determine a load on a serving carrier. The priority determination module 46 may be configured to determine a priority for each of a plurality of target carriers of the plurality of carriers, the priority being based at least in part on a number of wireless devices 16 being served by the serving carrier that receive a signal on a target carrier that exceeds a threshold. The load change module 48 may be configured so that when a determination is made to change the load of the serving base station based on a comparison of the load on the serving base station to a load change threshold, a load change request is sent to a target carrier having a highest priority.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby form a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for distributing wireless device traffic load in a wireless communication system having a plurality of base stations, the method comprising:
   determining a wireless device traffic load on a serving base station of the plurality of base stations;
   determining a priority for each of a plurality of target base stations of the plurality of base stations, the priority being based at least in part on a number of wireless devices being served by the serving base station that receive a signal from a corresponding target base station that exceeds a threshold;
   when a determination is made to change a load on the serving base station based on a comparison of the load on the serving base station to a load change threshold, sending a load change request to a target base station having a highest priority,
   wherein the load change threshold is a load consolidation threshold and when the comparison indicates that the load is less than the load consolidation threshold, the load change request is a load consolidation request, requesting that the target base station is to receive handover of at least one wireless device currently served by the serving base station;
   when all the wireless devices currently served by the serving base station is handed over to the target base station, powering down the serving base station to reduce power consumption; and sending the load consolidation request to an alternate target base station which has a next highest priority when no further wireless devices can be handed over to the target base station, wherein the serving base station maintains an orderly list of target base stations based on their priority in a neighbor relation priority (NRP) table and the NRP table is updated once a load consolidation operation is completed.

2. The method of claim 1, further comprising receiving a load consolidation accept message indicating that the target base station will receive handover of at least one wireless device currently served by the serving base station.

3. The method of claim 1, further comprising handing over wireless devices from the serving base station until a message is received indicating that the load on the target base station has reached an admission control threshold.

4. The method of claim 1, further comprising, when there are no further target base stations for which priority is determined, sending a second load consolidation request to the target base station after an elapsed period of time.

5. A serving base station configured to distribute wireless device traffic load in a wireless communication system having a plurality of base stations, the base station comprising:

processing circuitry including a memory and a processor:

the memory configured to store a priority for each of a plurality of target base stations of the plurality of base stations and at least a threshold; and the processor configured to:

determine a load on the serving base station;

determine a priority for each of at least one target base station of the plurality of base stations, the priority being based on a number of wireless devices being served by the serving base station that receive a signal from a target base station that exceeds a threshold;

when a determination is made to change a load on the serving base station based on a comparison of the load on the serving base station to a load change threshold, send a load change request to a target base station having a highest priority, wherein the load change threshold is a load consolidation threshold and when the comparison indicates that the load is less than the load consolidation threshold, the load change request is a load consolidation request, requesting that the target base station is to receive handover of at least one wireless device currently served by the serving base station;

when all the wireless devices currently served by the serving base station is handed over to the target base station, powering down the serving base station to reduce power consumption; and send a load consolidation request to an alternate target base station which has a next highest priority when no further wireless devices can be handed over to the target base station, wherein the serving base station maintains an orderly list of target base stations based on their priority in a neighbor relation priority (NRP) table and the NRP table is updated once a load consolidation operation is completed.

6. The serving base station of claim 5, the processor being further configured to receive a load consolidation accept message indicating that the target base station will accept handover at least one wireless device currently served by the serving base station.

7. The serving base station of claim 5, the processor being further configured to handover wireless devices served by the serving base station until a message is received that the load on the target base station has reached an admission control threshold.

8. The serving base station of claim 5, the processor being further configured, when there are no further target base stations for which priority is determined, to send a second load consolidation request to the target base station after an elapsed period of time.

9. A method for distributing wireless device traffic load in a wireless communication system among a plurality of carriers, the method comprising:

determining a wireless device traffic load on a serving carrier of the plurality of carriers;

determining a priority for each of a plurality of target carriers of the plurality of carriers, the priority being based at least in part on a number of wireless devices being served by the serving carrier that receive a signal on a target carrier that exceeds a threshold;

determining whether to change the load of the serving carrier to a target carrier having a highest priority based on a comparison of the load on the serving carrier to a load change threshold, wherein the load change threshold is a load consolidation threshold and when the comparison indicates that the load is less than the load consolidation threshold, the load change request is a load consolidation request, requesting that the target base station is to receive handover of at least one wireless device currently served by the serving base station;

when all the wireless devices currently served by the serving base station is handed over to the target base station, powering down the serving base station to reduce power consumption; and sending a load consolidation request to an alternate target base station which has a next highest priority when no further wireless devices can be handed over to the target base station, wherein the serving base station maintains an orderly list of target base stations based on their priority in a neighbor relation priority (NRP) table and the NRP table is updated once a load consolidation operation is completed.

10. A base station configured to distribute wireless device traffic load in a wireless communication system among a plurality of carriers, the base station comprising:

processing circuitry including a memory and a processor:

the memory configured to store a priority for each of a plurality of target carriers and at least a threshold; and the processor configured to:

determine a load on a serving carrier;

determine a priority for each of a plurality of target carriers of the plurality of carriers, the priority being based at least in part on a number of wireless devices being served by the serving carrier that receive a signal on a target carrier that exceeds a threshold;

determine whether to change the load of the serving carrier to a target carrier having a highest priority based on a comparison of the load on the serving carrier to a load change threshold, wherein the load change threshold is a load consolidation threshold and when the comparison indicates that the load is less than the load consolidation threshold, the load change request is a load consolidation request, requesting that the target base station is to receive handover of at least one wireless device currently served by the serving base station;

when all the wireless devices currently served by the serving base station is handed over to the target base station, powering down the serving base station to reduce power consumption; and send a load consolidation request to an alternate target base station which has a next highest priority when no further wireless devices can be handed over to the target base station, wherein the serving base station maintains an orderly list of target base stations based on their priority in a neighbor relation priority (NRP) table and the NRP table is updated once a load consolidation operation is completed.

* * * * *